F. RUPPERT.
TRACTOR ATTACHMENT.
APPLICATION FILED SEPT. 3, 1918.
1,363,756.
Patented Dec. 28, 1920.
2 SHEETS—SHEET 1.
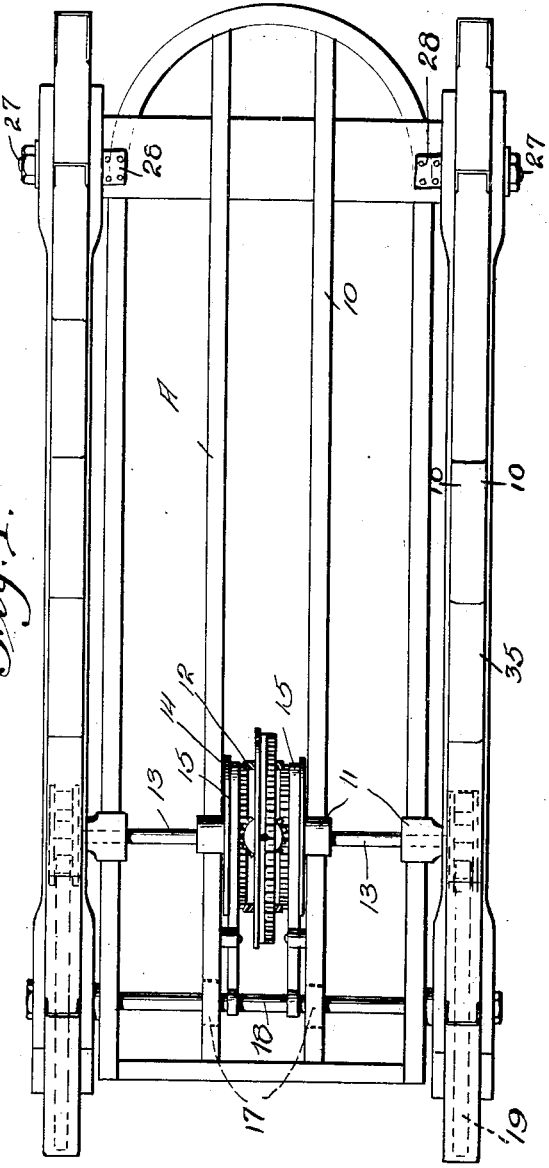
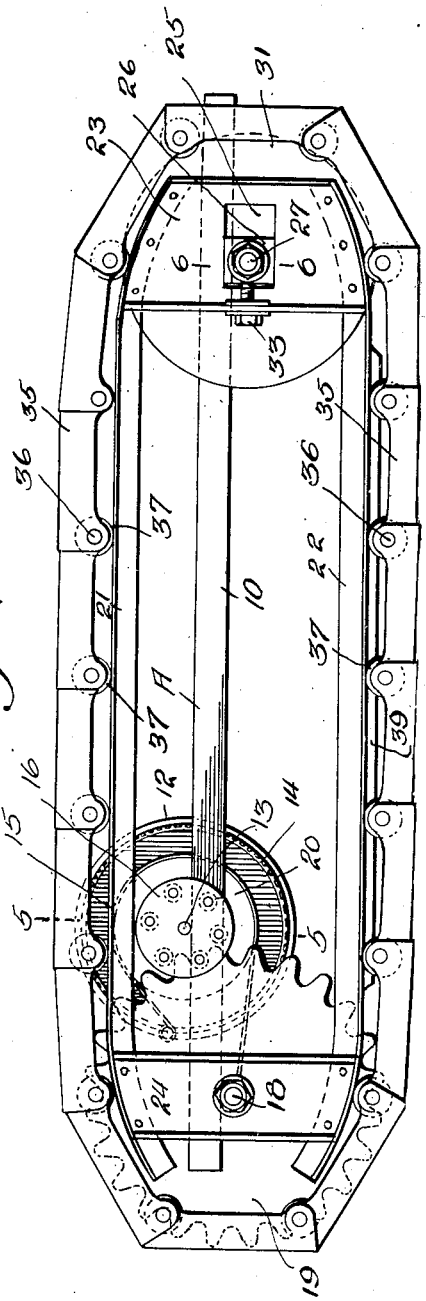
Witness
Ernest C. Crocker
J. D. Parker
Inventor
F. Ruppert
By Charles Chandler
Attorneys F. RUPPERT.
TRACTOR ATTACHMENT.
APPLICATION FILED SEPT. 3, 1918.
1,363,756.
Patented Dec. 28, 1920.
2 SHEETS—SHEET 2.
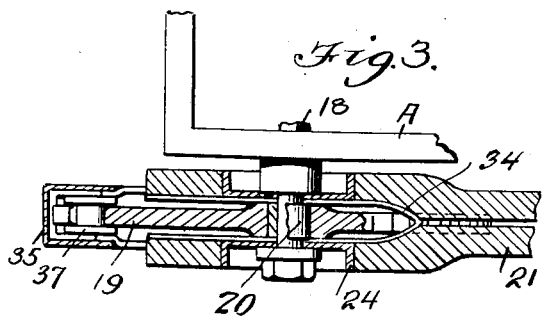
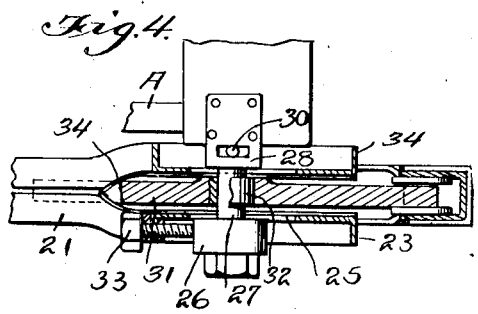
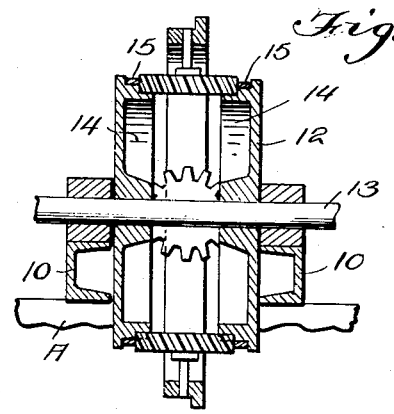
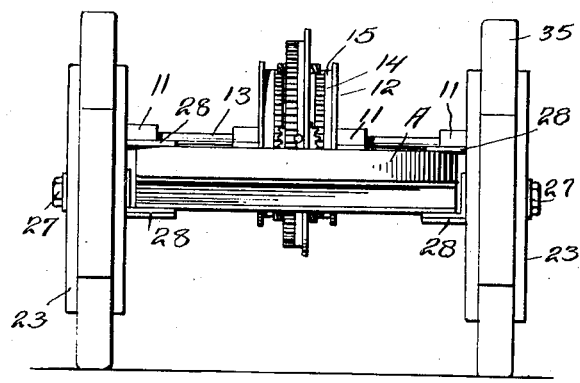
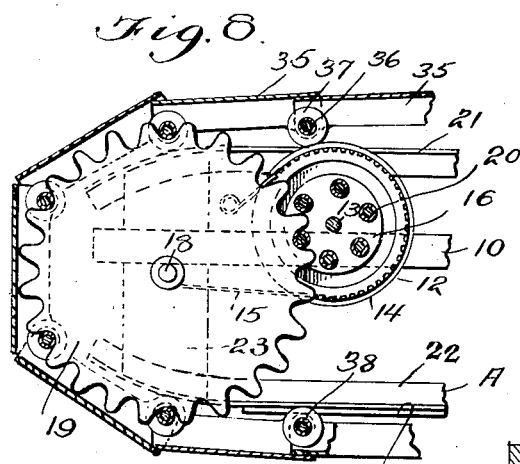
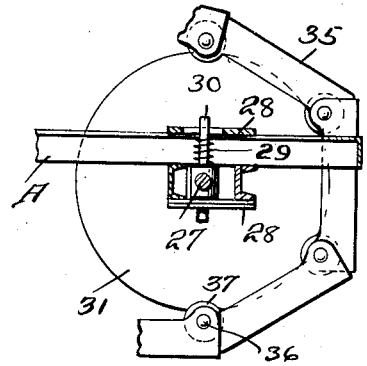
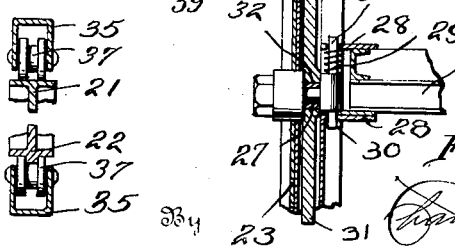
Inventor
F. Ruppert
Attorneys

UNITED STATES PATENT OFFICE.

FRANK RUPPERT, OF GLENCOE, MINNESOTA.

TRACTOR ATTACHMENT.

1,363,756.　　　　　Specification of Letters Patent.　　Patented Dec. 28, 1920.

Application filed September 3, 1918.　Serial No. 252,384.

*To all whom it may concern:*

Be it known that I, FRANK RUPPERT, a citizen of the United States, residing at Glencoe, in the county of McLeod, State of Minnesota, have invented certain new and useful Improvements in Tractor Attachments; and I do hereby declare the following to be a full, clear, and exact description of the invention, such as will enable others skilled in the art to which it appertains to make and use the same.

The invention relates to a tractor, and more particularly to the class of traction chain driven machines, vehicles, or the like.

The primary object of the invention is the provision of a chain of this character, wherein the same travels upon upper and lower rails and a front guide wheel, the latter being yieldably supported to permit the chain to give when traveling over irregular surfaces and thereby absorbing undue shocks and jars incident to the travel of the tractor, vehicle, or the like.

Another object of the invention is the provision of a chain of this character wherein the construction thereof is novel in form and the mounting of the same minimizes friction in the operation of the chain so as to decrease wear and assure easy operation thereof.

A further object of the invention is the provision of a chain of this character wherein the construction is comparatively simple, thoroughly reliable and efficient in its operation, strong, durable, and inexpensive to manufacture and install. Other objects will be in part obvious and in part hereinafter pointed out.

The invention accordingly consists in the features of construction and arrangement of elements, the construction of which will be exemplified in the description hereinafter set forth, and the scope of the application of which will be indicated in the claims hereunto appended.

In the accompanying drawings:—

Figure 1 is a top plan view of a tractor constructed in accordance with the invention;

Fig. 2 is a side elevation;

Fig. 3 is a fragmentary horizontal sectional view through one of the rails at the rear end portion thereof;

Fig. 4 is a view similar to Fig. 3 through the front end;

Fig. 5 is a fragmentary vertical transverse sectional view on the line 5—5 of Fig. 2;

Fig. 6 is a fragmentary vertical transverse sectional view on the line 6—6 of Fig. 2;

Fig. 7 is a fragmentary vertical sectional view through one of the stud axles;

Fig. 8 is a fragmentary vertical longitudinal sectional view through the rear portion of the machine;

Fig. 9 is a front elevation of the tractor;

Fig. 10 is a fragmentary sectional view on the line 10—10 of Fig. 1.

Similar reference characters indicate corresponding parts throughout the several views in the drawings.

Referring to the drawings in detail, A designates a main frame preferably of the shape shown in Fig. 1 of the drawings, and includes the longitudinal intermediate bars 10 which are disposed in spaced parallel relation to each other and support near the rear end of the frame inner bearings 11 having located therebetween differential gearing 12 which is driven from a motor (not shown) in any suitable manner and supported upon counter shafts 13. The latter are provided with brake drums 14 with which are adapted to engage bands 15 operated independently of each other in any suitable manner. Said shafts 13 carry at their outer ends anti-friction sprocket pinions 16 located beyond opposite sides of the frame 10 for a purpose presently described.

Near the rear end of the frame 10 are formed bearings 17 in which is journaled a rear axle 18 rotatably supporting driving sprocket wheels 19, the same being engaged with suitable anti-friction rollers 20 on pins in the sprocket pinions 16 to be driven thereby.

Supported longitudinally of the frame A at opposite sides thereof are wheel substitutes consisting of upper and lower rails 21 and 22 respectively, the front and rear ends being curved and converged and united to front and rear connecting plates 23 and 24 respectively, the rear plates being centrally pivoted upon the rear axle 18, while the front plates 23 are formed with horizontal slots 25 in which are mounted adjustable bearings 26. These receive front stud axles 27 mounted for vertical displacement in brackets 28 carried by the frame and held under tension through the medium of compression springs 29 coiled about guide pins 30 in said brackets 28 and slidably supporting said axles. Journaled in suitable anti-friction bearings 32 on each stud axle 27 is a front guide wheel 31.

The wheels 19 and 31 extend peripherally beyond the upper and lower rails for supporting the traction chains hereinafter fully described.

Each of the bearings is acted upon by an adjusting screw 33 threaded through an outturned web on the front connecting plate 23 for the truing of the front guide wheel 31 and this screw 33 also serves as a tightener for the chain.

The upper and lower rails 21 and 22 at their front and rear ends are bifurcated to form forks 34 for accommodating therein the front guide wheel 31 and the rear sprocket wheel 19 as will be obvious.

Each traction chain comprises a plurality of channeled links 35 preferably of substantially U shape in cross section, flexibly connected through the medium of transverse pivots 36 which support thereon in the channels of the links 35 peripherally grooved rollers 37 which travel upon the upper and lower rails 21 and 22, and mesh with the driven sprocket wheel 19, the grooves in the peripheries of the rollers 37 being designed to receive the front guide wheel 31. The flexibly connected links 35 are trained over the sprocket wheel 19, and the front guide wheel 31 so that the upper and lower stretches will have the rollers 37 travel upon the upper and lower rails 21 and 22, each roller 37 being fitted with antifriction bearings 38 to minimize friction and wear as will be obvious. Each lower rail 22 is formed with a guide rib 39 for the peripherally grooved rollers 37 to prevent sidewise or lateral displacement of the chain when traveling over said lower rail. The rear driven sprocket wheel 19 imparts movement to the flexible chain so that it becomes a substitute for a runner, and by reason of the particular mounting of the front stud axle 27 said chain is capable of limited lateral movement so that it will yield when the axle is deflected in steering the machine while traveling over an irregular course.

The brackets 28 are formed with slots for the guide pins 30 so that on adjusting the screws 33 the endless flexible chain can be tightened or slackened as the occasion may require.

The lower stretch of the chain constitutes the tread and movement thereof advances the truck as will be clearly apparent.

The chains when vertically displaced on traveling over an irregular surface or obstructions will absorb all shocks and jars incident to the travel of the truck.

It is of course to be understood that such changes, variations and modifications may be made in the invention as come properly within the scope of the appended claims without departing from the spirit of the invention or sacrificing any of its advantages.

From the foregoing it is believed that the construction and manner of operation of the invention will be clearly understood, and therefore a more extended explanation has been omitted.

What is claimed is:

1. The combination with a frame, of rails at opposite sides of the frame at top and bottom, a rear axle on said frame supporting the rear portions of the rails, front stud axles on the frame supporting the front portions of said rails, flexible endless chains having rollers movable around said rails, driving means for the chains carried by the rear axle, guide means for the chains carried by the stud axles, resilient means for permitting vertical displacement of the stud axles, and means on each lower rail engaging the rollers to prevent lateral displacement of the chain.

2. The combination with a frame, upper and lower rails at opposite sides of the frame, a rear power axle and front stud axles on the truck frame and supporting said rails, flexible endless chains movable around said rails, driving wheels carried by the rear axle for imparting movement to the chains, guide wheels on the stud axles for said chains, resilient means for permitting vertical displacement of the stud axles, means on each lower track engaging the rollers to prevent sidewise movement of the runner, and forks formed in the rails for receiving the driving and guiding wheels.

3. The combination with a frame, upper and lower rails at opposite sides of the frame forked at their ends a two part rear axle and differential on said frame, front stud axles on the frame, endless chains movable around said rails, driving wheels carried by the rear axle and projecting through the rear forks for imparting movement to the chains, guide wheels on the stud axles and projecting through the front forks for engaging said chains, and pivotal and resilient supports for said stud axles.

4. The combination with a frame, guide rails at opposite sides of the frame, a rear axle having driving wheels, front stud axles having guiding wheels, and flexible endless traction chains moving around said rails and engaging said wheels; of resilient means for pivotally mounting the stud axles on the frame and permitting their vertical displacement, and means for vertically guiding them on displacement thereof.

5. The combination with a frame, rails at opposite sides of the frame, a rear power axle in two parts mounted on said frame and connected by differential mechanism, independently operable brake means coactive with the differential gear connections, and front stud axles pivotally and yieldably supported on said frame; of flexible endless traction chains having grooved rollers movable on said rails, driving wheels carried by the rear axle for imparting movement to the chains, guide wheels on the stud axles engaging the grooves in the rollers, and ribs along the bottom of certain rails also engaging the grooves of the rollers to prevent sidewise movement of the chains.

6. In a structure of the character described, spaced parallel upper and lower rails, endless traction chains trained about said rails, anti-friction rollers carried by the chains and movable over the rails, means supporting the rails at the rear end thereof, vertically displaceable means supporting the rails at the front end thereof, guide wheels for the chains in the last named means, and driving means for said chains.

In testimony whereof, I affix my signature, in the presence of two witnesses.

FRANK RUPPERT.

Witnesses:
WM. BELANGER,
MAX ASCHER.